March 31, 1970 G. R. REID 3,504,357

PLATED WIRE MEMORY BASE ASSEMBLY

Filed Nov. 23, 1964

INVENTOR
GILBERT R. REID

BY William E. Cleaver

ATTORNEY

United States Patent Office 3,504,357

Patented Mar. 31, 1970

3,504,357

PLATED WIRE MEMORY BASE ASSEMBLY

Gilbert R. Reid, Norristown, Pa., assignor to Sperry Rand Corporation, New York, N.Y., a corporation of Delaware Filed Nov. 23, 1964, Ser. No. 413,164
Int. Cl. G11b *5/00;* H05k *1/00*
U.S. Cl. 340—174 2 Claims

ABSTRACT OF THE DISCLOSURE

The present structure provides a plurality of word strap laminates, each of which has an electrically non-conductive base with a printed circuit thereon forming an open ended loop. Further the open ended loops are wave-like in their formation and arranged so that the valleys formed by the upper wave lie opposite the valleys formed in the lower wave. In addition, there are apertures lying within the open loop and within the wider areas between the upper and lower waves. These apertures are aligned with one another to provide tunnel like structures into which are inserted plated wire elements, thus creating a memory device. The printed circuits act as word straps in a typical plated wire memory.

This invention relates to memory devices and more particularly to plated wire memories.

Plated wire memories normally include a number of wire elements, each of which has a thin film of magnetizable material secured to its outer surface. A plurality of word drivers are employed in such a memory and are arranged to overlie the wire elements in a perpendicular, or grid-like, fashion. At each point where a word driver overlies a wire element there is defined a bit storage location. In addition to the above arrangement, bit drivers and read amplifiers are connected to the wire elements to handle the read-write operation, and, accordingly, a plated wire memory is fundamentally complete. Obviously, there have been many innovations of the basic structure described above.

Since plated wire memories lend themselves to miniaturization there has been a trend to so use plated wire memories. The plated wire element in popular use has a diameter in the range of 5 mils to 10 mils, and the word straps which overlie the wire elements have a width in the range of 5 mils to 45 mils and a depth in the range of 1 mil to 10 mils. When elements of the above-described dimensions are assembled in package form, the fabrication is very difficult and therefore very costly. The fabrication costs for plated wire memories of the prior art have oftentimes rendered such plated wire memories economically prohibitive for their intended use.

Accordingly, it is an object of the present invention to provide an improved means for assembling a plated wire memory.

It is a further object of the present invention to provide a plated wire memory assembly which is relatively economical to fabricate.

In accordance with a feature of the present invention there is provided a plurality of word strap laminates, each of which has a printed circuit forming an open loop and secured to a non-conductive base.

In accordance with another feature of the present invention there is provided a plurality of apertures which are discretely spaced within the bay area defined by the open loop described with the above feature and it is further provided that each of the laminates are so arranged that the apertures of each laminate are aligned with corresponding apertures of other laminates providing tunnel-like holes completely through a stack of laminates. The tunnel-like holes are the means which receive the plated wire elements.

In accordance with another feature of the present invention, each laminate is originally formed with two end pieces that have guide holes therein which provide a means for assembling the laminates so that the apertures form the tunnel-like holes as described above.

The foregoing and other objects and features of this invention will be best understood by reference to the following description of an embodiment of the invention taken in conjunction with the accompanying drawings wherein.

In general, the present invention comprises a plurality of word strap laminates which are stacked together and secured in this stacked position by some potting means. Each of the laminates has a printed circuit formed thereon, which printed circuit is fabricated in accordance with well known printed circuit techniques. For instance, the printed circuit can be formed by having a template of its preferred shape photographed in order to make a negative thereof and having a laminate with photosensitive material thereon exposed to the said negative in order to transfer the pattern to said element. In accordance with this well known printing procedure the element would then be subjected to an etchant bath and that portion which was not exposed to the light would be eaten away thereby just leaving the pattern of the template on the base.

In the preferred embodiment of the present invention, copper is secured to a glass epoxy base and a pattern of the word strap is etched from this copper in accordance with a preferred pattern. In the preferred embodiment, the pattern is an elongated U-shape or an open loop shape pattern. Further, in accordance with the preferred emodiment the pattern has a wave-like form along both the top and the bottom legs of the sides of the bay. As will be explained in detail hereinafter these wave-like shapes provide or define smaller bay-like openings and when coupled with bay-like opening on its opposite side, virtually surround little areas of the glass epoxy base.

Into each of these last-described surrounded areas there is etched or drilled an aperture. The apertures are of a slightly greater diameter than the plated wires that they eventually will hold. After having so etched the word strap laminate it is ready for further assembly with identical word strap laminates to provide the basic structure of a plated wire memory.

Each of the word strap laminates in a preferred embodiment has an additional portion of the glass epoxy with guide holes etched therein, which etching took place at the same time that the apertures were etched, thereby making certain that the apertures are in accurate alignment with the two guide holes. The guide holes are relatively large thereby enabling a human or a machine to readily operate with these large apertures, and assemble the stacks on two guide rods for a further potting operation, thereby all of the elements will be secured to one another in a single package.

Figure 1:
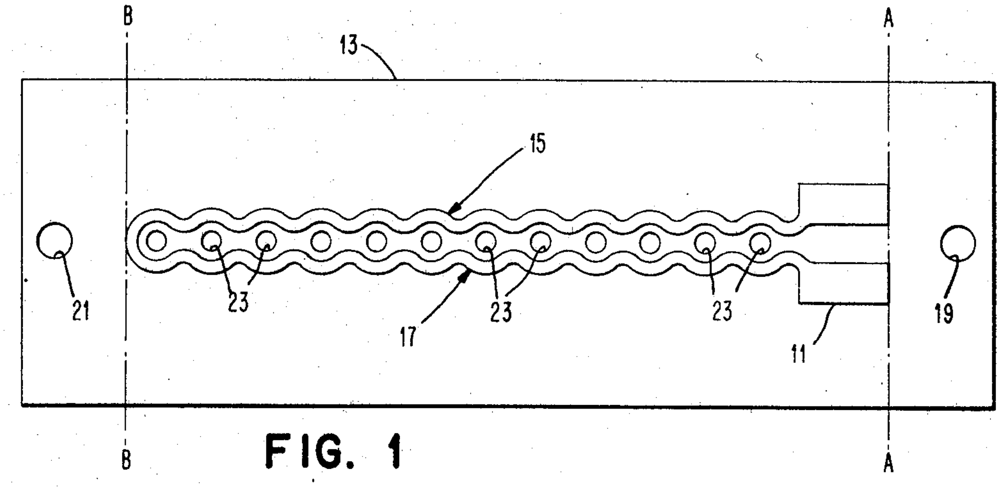
FIGURE 1 is a plan vew of a word strap laminate.

Having considered the general assembly of the present invention, consider now the details of the assembly. Examine FIGURE 1 wherein there is shown a pictorial of the word assembly. In FIGURE 1 the copper word strap 11 has been etched from a complete copper covering of the non-conductive base 13. In a preferred embodiment the non-conductive base 13 is glass epoxy, and the word strap is copper, although it should be readily understood that other conductive metals such as gold, silver, and the like might be used in place of the copper 11 and other non-conductive bases such as phenolic resin and the like might be used for the base 13.

It will be noted in FIGURE 1 that the word strap 13 forms an open loop, or an elongated U-shaped pattern if the U is considered lying on its side. It will also be noted in FIGURE 1 that the upper leg 15 and the lower leg 17 of the word strap each have a wave-like configuration so arranged that the valleys of the wave on the upper leg lie opposite the valleys of the waves of the lower leg. It can be seen in FIGURE 1 that the way in which two opposite valleys meet they virtually encompass or isolate the little islands of the substrate 13, although the troughs of the upper leg never actually come in contact with the troughs of the lower leg 17. It should be understood that other configurations for the printed circuit element 11 might be used, but as will be explained more in detail hereinafter there is an advantage in having waveform as shown in FIGURE 1.

The substrate 13 after it has had the printed circuit 11 formed thereon is subjected to a second photographic process to fix certain portions thereof and is subsequently dipped in an etching bath which does not disturb the conductive element 11, but does cause the holes 19 and 21 to be etched in the substrate 13, as well as the apertures 23. The guide holes 19 and 21 are much larger than the apertures 23 and are included to provide a means for guiding the element into position with other such elements.

Figure 2:
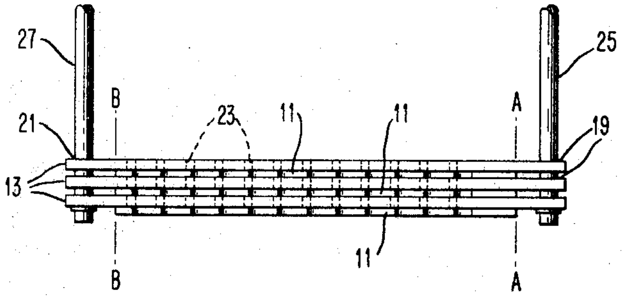
FIGURE 2 is a schematic showing the word strap laminates mounted on guide rods.

In FIGURE 2 there is shown the schematic of a number of elements which are aligned with one another by virtue of the holes 19 in each of the elements. It can also be appreciated in FIGURE 2 that the aperture 23 pass through each of the substrates and therefore provide a tunnel for the entire stack of elements so that the plated wires of the plated wire memory might be slipped into or located within these tunnels. The dimensions of the element and of the copper printed circuit are obviously exaggerated in FIGURES 1 and 2 for the purpose of illustration. As can be seen in FIGURE 2 the word strap elements are stacked on the guide bars 25 and 27 which are securely mounted in a jig not shown. After the proper number of elements have been mounted as shown in FIGURE 2 the stack is entirely potted with an epoxy resin in the preferred embodiment, or with some other potting materials such as urethane resin. The stack emerges as a single package which in general is shown in FIGURE 3, although FIGURE 3 is shown without the guide hole portions.

Figure 3:
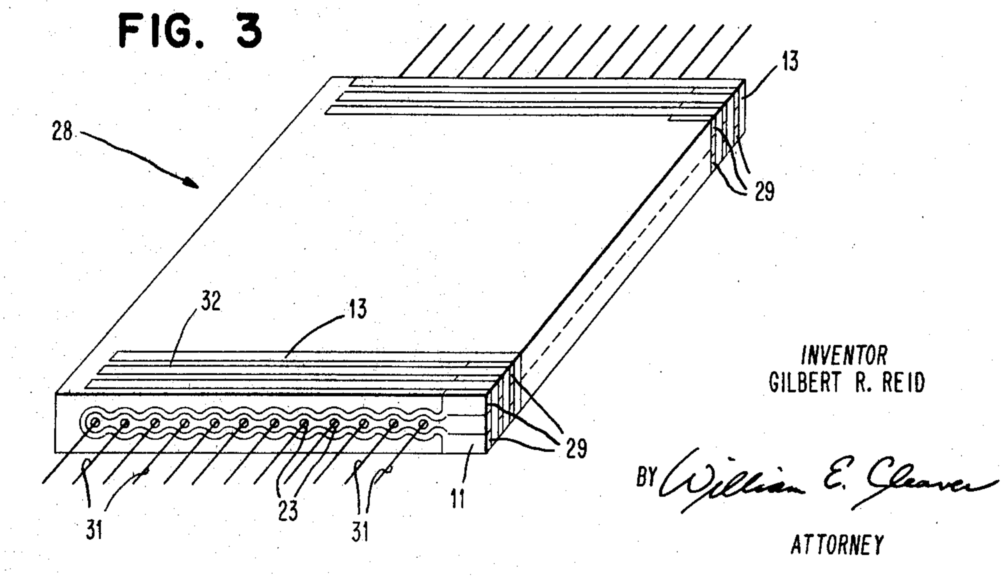
FIGURE 3 is a pictorial showing the final assembly of a set of laminates after the guide portions have been removed.

After the stack has been potted the guide hole portions are machined off along the lines AA and BB of FIGURE 2 and portions of the top and bottom are machined off as is obvious from FIGURE 3. When the package has the guide hole portions machined off, the end result appears as shown in FIGURE 3. In FIGURE 3, it is apparent that the connector portions of the printed circuits 29 are available to have the word drivers connected thereto. As can also be seen in FIGURE 3 the plated wires are inserted through the aligned apertures 23 to enable the word straps to overlie the plated wires in the normal plated wire memory fashion.

The wave configuration of the word straps in the present invention provides that the valleys in between the aperture 23 and therefore in between the plated wires 31 lie in close proximity to one another. In accordance with the principle described in the U.S. patent application, Ser. No. 241,368, entitled "Form of Plated Wire Memory Device," filed Nov. 30, 1962, by Fedde et al., the principle of having the two opposite sides of the word strap lying in close proximity enables the word driver to flip the magnetic moment at the bit storage location with less driving energy than would be required if the word strap did not lie in close proximity to its counterpart. The reason for this being that the flux from one side of the word strap serves to cancel out the flux from the other side of the word strap (in effect there is less mutual coupling between each side of the word strap) and thus the amount of drive signal to rotate the magnetic moment from the hard axis to the easy axis is less than would be required if the mutual coupling were not reduced.

While I have described above the principles of my invention and in connection with specific apparatus, it is to be clearly understood that this description is made only by way of example and not as a limitation of the scope to my invention, as set forth in the objects thereof and in the accompanying claims.

The embodiments of the invention in which an exclusive property or privilege is claimed are defined as follows:

1. A plated wire housing for operatively associating a plurality of plated wires with a plurality of word strap elements, comprising in combination (a) a plurality of word strap elements, each of said word strap elements comprising on one side only a printed circuit member secured to a non-conductive substrate, each of said printed circuit members formed in the configuration of an elongated open-loop thus defining a bay area therein;

(b) a plurality of discretely spaced apertures formed in each of said non-conductive substrate elements, each of which opens into the bay area defined by said elongated loop, said apertures further disposed such that none of them comes in contact with the associated printed circuit member forming the bay therearound;

(c) each of said word strap elements further having guide apertures horizontally aligned with said discretely spaced apertures to enable said elements to be stacked with respect to one another so that the discretely spaced apertures of one word strap element are aligned with the discretely spaced apertures of all other word strap elements to form tunnel-like holes, with each of said printed circuit members being substantially parallel;

(d) securing means acting to secure said plurality of word strap elements together to form a block element thereby permanently aligning the apertures of said word strap elements to receive plated wires therein; and (e) a plurality of plated wires, each of which has an electrically conductive base means with a layer of magnetizable material, characterized by a uniaxial anisotropy, secured to the circumferential surface thereof and each of said plated wires inserted into a different one of said tunnel-like holes.

2. A plated wire housing for operatively associating a plurality of plated wires with a plurality of word strap elements, comprising in combination (a) a plurality of word strap elements, each of said word strap elements comprising on one side only a printed circuit member secured to a non-conductive substrate, each of said printed circuit members formed in an elongated open loop configuration to accordingly define a bay area;

(b) each of said word strap elements further formed with a wavelike configuration along the upper and the lower horizontal legs thereof, said wave-like configuration disposed so that the valleys of the upper and the lower horizontal legs are virtually in contact with one another but not actually in contact with one another and the nodes of the upper and lower legs lie opposite one another to define lake areas of the non-conductive substrate;

(c) a plurality of discretely spaced apertures in said non-conductive substrate, each of which opens into a different one of said lake areas defined by the nodes and the valleys of the wave configuration of the associated word strap element, each of said apertures being further disposed to avoid coming in contact with the associated printed circuit member forming the loop therearound;

(d) each of said non-conductive substrates having a guide aperture at either end thereof, said guide apertures being disposed with respect to said discretely spaced apertures such that when the guide apertures of each word strap element are aligned with one another the discretely spaced apertures will also be in alignment with one another and each of said printed circuits members being substantially parallel;

(e) securing means acting to secure said plurality of word strap elements together to form a block element and thereby to permanently align said discretely spaced apertures with one another to form tunnel-like holes to receive plated wire elements therein; and (f) a plurality of plated wires, each of which has an electrically conductive base means with a thin layer of magnetizable material, characterized by a uniaxial anisotropy, secured to the circumferential surface thereof, and each of said plated wires being inserted into a different one of said tunnel-like holes.

References Cited

UNITED STATES PATENTS

| | | | |
|---|---|---|---|
| 3,028,573 | 4/1962 | Stoehr | 317—101 X |
| 3,196,318 | 7/1965 | Richardson | 317—101 |
| 3,134,965 | 5/1964 | Meir | 340—174 |
| 3,161,862 | 12/1964 | Williams | 340—174 |
| 3,164,813 | 1/1965 | Rajchman | 340—174 |
| 3,286,242 | 11/1966 | Gianola | 340—174 |
| 3,061,821 | 10/1962 | Gribble et al. | 340—174 |
| 3,083,353 | 3/1963 | Bobeck | 340—174 |
| 3,316,541 | 4/1967 | Fischer | 340—174 |

FOREIGN PATENTS

| | | |
|---|---|---|
| 951,806 | 3/1964 | Great Britain. |

STANLEY M. URYNOWICZ, Jr., Primary Examiner

U.S. Cl. X.R.

174—68.5